United States Patent
Baldrige

(10) Patent No.: US 9,426,341 B1
(45) Date of Patent: Aug. 23, 2016

(54) MOUTH-LOCATABLE CAMERA MOUNT

(71) Applicant: Michael K. Baldrige, Lahaina, HI (US)

(72) Inventor: Michael K. Baldrige, Lahaina, HI (US)

( * ) Notice: Subject to any disclaimer, the term of this patent is extended or adjusted under 35 U.S.C. 154(b) by 0 days.

(21) Appl. No.: 14/544,255

(22) Filed: Dec. 15, 2014

(51) Int. Cl.
*H04N 5/222* (2006.01)
*H04N 7/18* (2006.01)
*H04N 5/225* (2006.01)

(52) U.S. Cl.
CPC .................................. *H04N 5/2252* (2013.01)

(58) Field of Classification Search
CPC ...... A61B 1/24; A61B 1/042; A61B 1/00052; A61B 1/00183; A61B 1/00188; A61B 1/055; A61B 1/0669; A61B 1/247; A61B 6/145; A61B 6/4233; G06T 7/004; H04N 13/0207; A61C 9/004; A61C 9/008
USPC ................ 348/81, 151, 207.99, 373
See application file for complete search history.

(56) References Cited

U.S. PATENT DOCUMENTS

| | | | |
|---|---|---|---|
| 4,183,056 A | 1/1980 | Evans et al. | |
| 5,254,852 A | 10/1993 | Filipovich et al. | |
| 8,319,845 B2 | 11/2012 | Ortiz | |
| 8,452,154 B2 | 5/2013 | O'Connor et al. | |
| 2003/0148243 A1* | 8/2003 | Kerschbaumer ... | A61B 1/00041 433/29 |
| 2005/0084816 A1* | 4/2005 | Mehdizadeh ............ | A61B 1/24 433/29 |
| 2013/0209954 A1* | 8/2013 | Prakash .............. | A61B 1/00188 433/29 |
| 2014/0132747 A1* | 5/2014 | Andrews ............ | A61B 1/00147 348/66 |
| 2014/0272773 A1* | 9/2014 | Merritt .................. | A61B 5/0088 433/29 |
| 2015/0312446 A1* | 10/2015 | Blackman ............ | H04N 5/2252 348/373 |

* cited by examiner

*Primary Examiner* — Trung Diep
(74) *Attorney, Agent, or Firm* — Paul R. Martin

(57) ABSTRACT

A mount for a video recorder set which is supported by the user's mouth.

4 Claims, 4 Drawing Sheets

MOUTH-LOCATABLE CAMERA MOUNT

TECHNICAL FIELD OF THE INVENTION

The invention relates in general to hands-free camera systems, and, more particularly, to recording a video signal in connection with personal activities such as sports activities including scuba diving, skiing, surfing. kayaking, sailing and so on, as well as non-sport activities like archeological field research, crime investigation, and the like.

BACKGROUND OF THE INVENTION

Sporting activities, such as mountain biking, off-road motorcycle riding, downhill skiing, snowmobiling, auto racing and hand gliding frequently involve covering considerable distances, at high speed and with constantly changing body positions. Many enthusiasts and participants in these sporting activities and other high-intensity sporting activities are intensely interested in their respective sports and often like to make and view video recordings of their participation in the sporting activity.

Traditionally, such recordings are made by a second party capturing the participant on tape with a video camera recorder unit which are well known and readily available. However, such a recording lacks the thrill factor experienced by the participant. Furthermore, the participant would usually rather record the activity from the perspective they experience while participating in the activity. That is, they want to record the sporting activity exactly as they saw, heard and felt it, as opposed to the perspective of another party viewing their performance. They can then use the video tape recording to improve their skills, reminisce and share their enthusiasm with family and friends.

Furthermore, a second party recording will normally include only the sounds and narration of the camera operator and would not include the voice of the participants or the sounds that they experience. Recordings are usually more interesting, memorable, and desirable to listen to when they capture the audio images of the activity as well as the video images.

Video tape recordings of events in which a participant may be involved are also available through some professional video production companies. For example, a ski resort may offer to film a skier as a memento of their trip. However, these recordings are also second person recordings and they do not capture the experience from the participant's point of view. Furthermore, smaller events and informal outings with friends do not warrant the attention of professional production companies and thus, to make a recording, the participant must find a person to hold and operate the camera equipment. If a person is alone in their participation, such as is often the case with motorcycle riding or skiing, they usually cannot capture the event on video tape, or digital recording means.

Additionally, the video camera recorders and commercial video equipment which are available for use by the general public are often inadequate for capturing the sporting activity because of the physical nature of the activity. For example, available equipment is cumbersome and in many cases is impossible to use while skiing or while operating a vehicle such as a snowmobile or motorcycle. Despite the inadequacies of video available equipment, many attempts are made in adapting available video equipment for capturing sporting activities on video tape. Skiers have tried to ski while holding, in their hands, a video recorder. This is not only dangerous, but also inadequate because the camera bounces around as the skier moves. The skier's performance is also hampered. Additionally, motorcyclists have tried to secure a video recorder to their motorcycle or to their helmet, but have not had much success in capturing the activity with stable, easily-viewed video images. Still further, snowmobilers have tried to affix a recorder behind the windshield of the snowmobile. Despite these efforts, the end results and the captured video images are still inadequate. As mentioned, these types of methods also hinder the participant's performance and have otherwise infringed on their enjoyment of the sporting activity.

Therefore, there is a need for a self-contained recording devices which allows complete freedom of movement while accurately tracking the line of sight of the user.

Several previous inventions have been directed to capturing video images while maintaining the participant's hands free to move and handle other activities. However, the prior art devices require additional equipment or specially modified equipment not normally worn by the participant.

In the prior art several techniques have been utilized to mount cameras in a fashion which allows them to follow the head movement of an individual in an attempt to synchronize the field of view of the camera with the field of view of the individual involved. These include attempts to produce video and film photograph of such intricate manual manipulations as surgical procedures and the like. One commonly used method for viewing surgical operations involves the use of one or more dolly-mounted cameras (including operators) and/or overhead-mounted remotely aimed and controlled cameras.

The art also contains many examples of head-mounted camera systems. A device of this nature is illustrated and described in a patent to P. P Dukich, R. L. LeChevalier and J. A. Volk, U.S. Pat. No. 3,919,475 issued Nov. 11, 1975. The invention disclosed in this patent includes a head-mounted camera system which includes remotely controlled focusing and aiming optics and a remotely aimed illumination system. The camera, optical focus, line of sight, plus all video control including monitoring and recording (if desired) and operated by a single operator at a remote control console which may be located outside the work area. The illumination system of that invention includes a cold illumination system (having separate sources such as fiber optic optical bundles) which are ridgedly attached to the head-attached camera unit. The mounting of the illuminators is such that both are bore-sighted to the camera line of sight so that the illumination system illuminates subject matter coincident with the field of view of the camera system. Thus, the location lighted by the illumination system is also controlled remotely with the aiming of the camera.

While that system has been successfully used in the past to produce excellent video results, it does suffer from certain limitations. Whereas the bore-sighted illumination system operated in conjunction with the remote focusing and aiming systems presents an advantage to the remote operator of the television camera system, the remote aiming of the illumination system has been found to interfere with the work of the surgeon or other wearer of the head-attached television system. A wearer accustomed to wearing a standard head-mounted illuminator such as is typically worn by surgeons tends to steer the light field to suit his needs by rotating and/or nodding his head slightly. When such a wearer uses a head-attached television, he likewise attempts to steer the light field by moving his head. The remote operator or controller of the head-attached television system, however, is at the same time attempting to remotely control the field of view of the camera and with it the light field. The position of the light desired by the surgeon and the remote controller often do not coincide. In fact, they may often be at odds. The wearer, although unconcerned with the remote camera operation, moves his head to center the light field as he desires. This also shifts the camera field of view and the remote controller reacts to re-center the camera field which also shifts the light field. This cycle may continue until the limit of remote adjustment is reached at which point the wearer can control the location of the illumination field. However, he generally will have to hold his head in an unusual and/or uncomfortable position and the remote operator is no longer able to properly center the action in the camera field of view.

Other examples include U.S. Pat. No. 4,953,766 which discloses a camera mounted to the side of a frame which fits on a wearer's head. However, the device of the patent creates an off-center camera angle several inches to the right or left of the participant's line of sight. The camera mounting structure also must be worn on the head and would prevent the use of a helmet, which is a very undesirable situation in potentially dangerous sporting activities. The camera and mounting structures also create an unnatural weighted feeling to the side of the wearer's head. Still further, the camera equipment is left exposed to the elements creating a situation where by the equipment may be damaged. For instance the lens of the camera or the camera device itself may be broken by flying mud, rocks and related debris one encounters, such as while aggressively riding motorcycles in an off-road environment.

U.S. Pat. No. 4,516,157 which discloses an eyeglass in which a camera and viewfinder are combined is yet another example of known systems. Many participants in the aforementioned sporting activities are very particular about the type of equipment they use. This device forces them to use the specially formed glasses which are uncomfortable and may prevent the use of other necessary equipment. For instance, skiers generally wear sunglasses or double pane goggles, while motocross riders wear single pane goggles and an open-face helmet with a wrap around mouth guard or chin guard. Snowmobilers, on the other hand, do not wear goggles, but prefer a full face helmet with a mouth guard and a shield to serve the purpose of goggles. The glasses required would interfere with the use of this necessary equipment and also may interfere with the participant's vision.

In addition to the above, the art also contains a miniature video camera mounted, for example, on a skier's helmet. To date, micro video recorder sets are known to service—among other markets—the marketplace of law enforcement and public safety for purposes of incident surveillance, evidence recording, in-vehicle video for moving or stationary vehicles including police cruisers and/or helicopters. These have been termed "video incident" recorder sets by the industry. Video incident recorders are available with much variety among various products.

Therefore, there is a need for a video camera system for use in recording participation in a sporting activity, and particularly in recording the sporting activity participation from the perspective of the participant.

There is a more specific need for a video camera system that can be used without hindering the activity of the user's hands.

There is also a need for a camera that can record a sporting activity from the participant's perspective with adjustability in the system for capturing the activity in the line of sight of the participant.

There is a more specific need for a video camera system that can be used by a swimmer, a scuba diver or a snorkeler

SUMMARY OF THE INVENTION

These and other aspects and objects of the invention are provided by a mount for a video recorder set which is supported by the user's mouth. This will free the user's hands and capture the activity from the user's perspective. The mouth-supported can be used by a vacationer or athlete (among others) who wishes to self-record his or her own amusement—i.e., recreational or competition or training activity—regardless if indoors or outdoors, underwater or otherwise. Examples of users and activities in accordance with the invention include, without limitation, a swimmer, a scuba diver, a snorkeler, a skier, a cyclist, a kayaker, surfer, snowboarder or the like in self-recording his own activity.

Having the camera mounted on a person's mouth guard permits the user to film or record his/her surfing experience with both hands free, which help keeps the user's balance. The system of the present invention stays in a person's mouth without the user having to bite it. This system also allows a person to breathe while it is inside of a person's mouth.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWING FIGURES

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Figure 1:
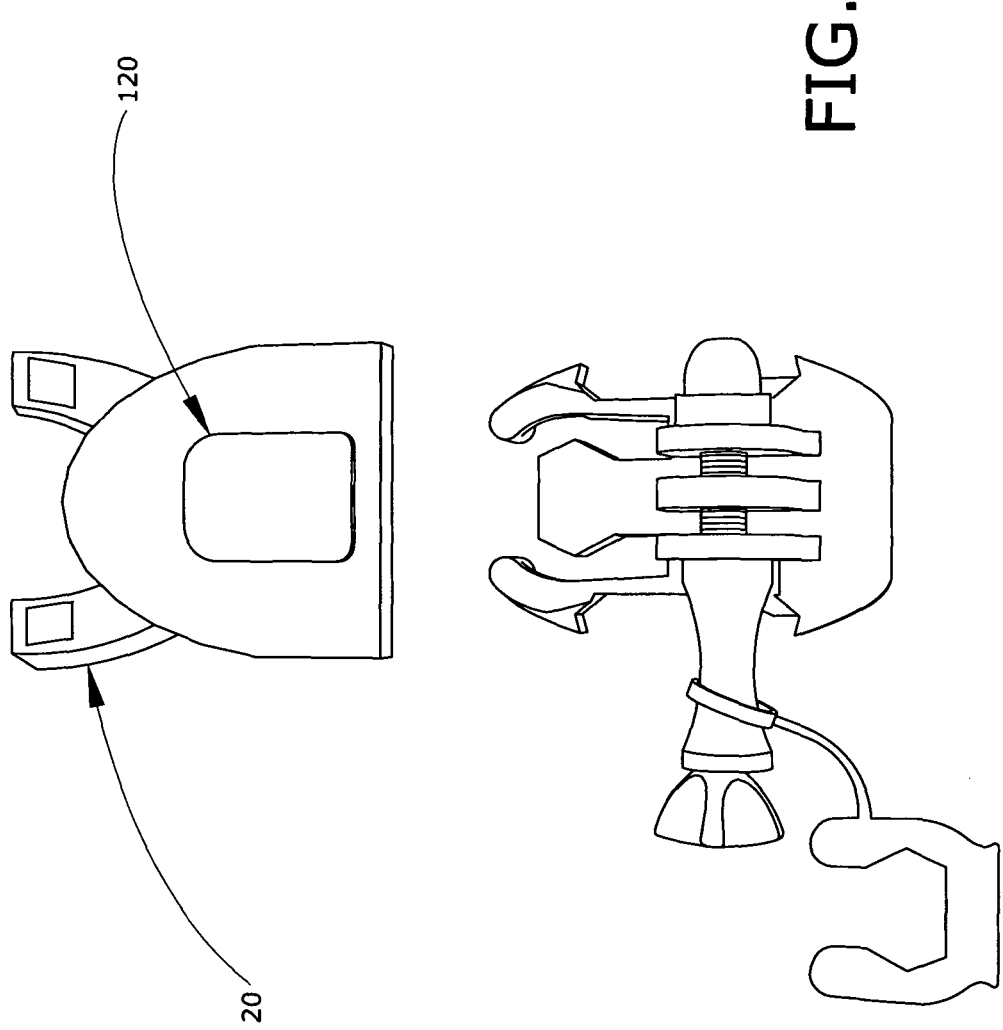
FIG. 1 shows the support unit in combination with a mini-camera support with the bottom side of the support unit facing the viewer, that is, the support unit is shown bottom side up in FIG. 1.

Referring to the figures, it can be understood that the present invention is embodied in a support 10 for a mini-camera, such as a Go-Pro® camera or the like, for use in hands-free operation. The support unit comprises a one-piece base 20 which is adapted to be held in a user's mouth in the manner of a dental mouthpiece during use and which includes a first surface 30 which is a bottom surface when the base is in use and a second surface 40 which is a top surface when the base is in use, the second surface being planar. The mouthpiece further includes a first end portion 50 which is a forward end portion and extends outside the user's mouth when the base is in use and a second end portion 60 which is an aft end portion and which is located inside the user's mouth adjacent to the user's molar teeth when the base is in use.

Two-teeth-engaging channels 70 and 72 are located on the top surface of the mouthpiece and located forward-adjacent to the aft end portion 60 of the base and spaced apart from the forward end portion 50 of the base. The teeth-engaging channels are identical and each teeth-engaging channel has a first side wall 80 which is located outside the user's teeth and between the user's teeth and the user's cheek when the base is in use and a second sidewall 82 which extends parallel to the first sidewall and which is located inside the user's teeth and between the user's teeth and the user's tongue when the base is in use. The teeth-engaging channels in combination with the base define a teeth-accommodating channel into which the user's teeth fit when the user bites the base whereby a user's teeth are accommodated in the teeth-engaging channels to support the base in the user's mouth by the user biting down on the base. In the form of the invention shown in the figures, the two sidewalls of the teeth-engaging channels are co-terminal with each other. In the preferred form of the invention, the teeth-engaging channels are entirely located inside the user's mouth when the support unit is in use.

Figure 2:
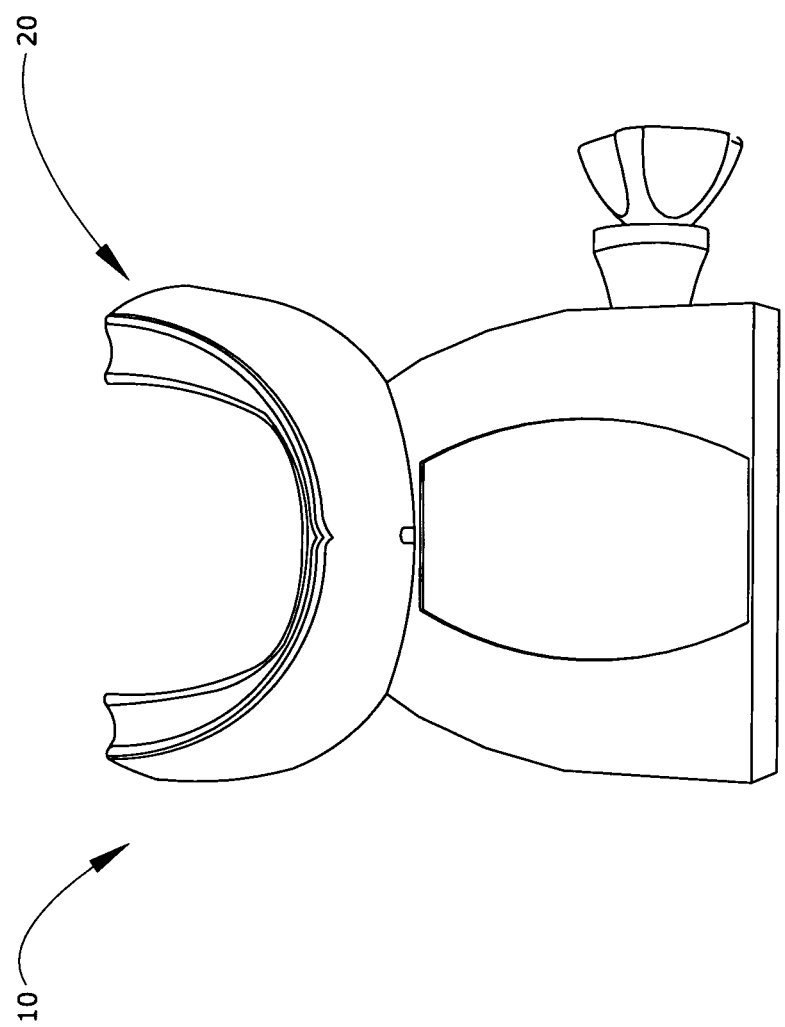
FIG. 2 shows a front end view of the support unit in combination with a mini-camera support with the top side of the support unit facing the viewer, that is, the support unit is shown top side up in FIG. 2.
Figure 3:
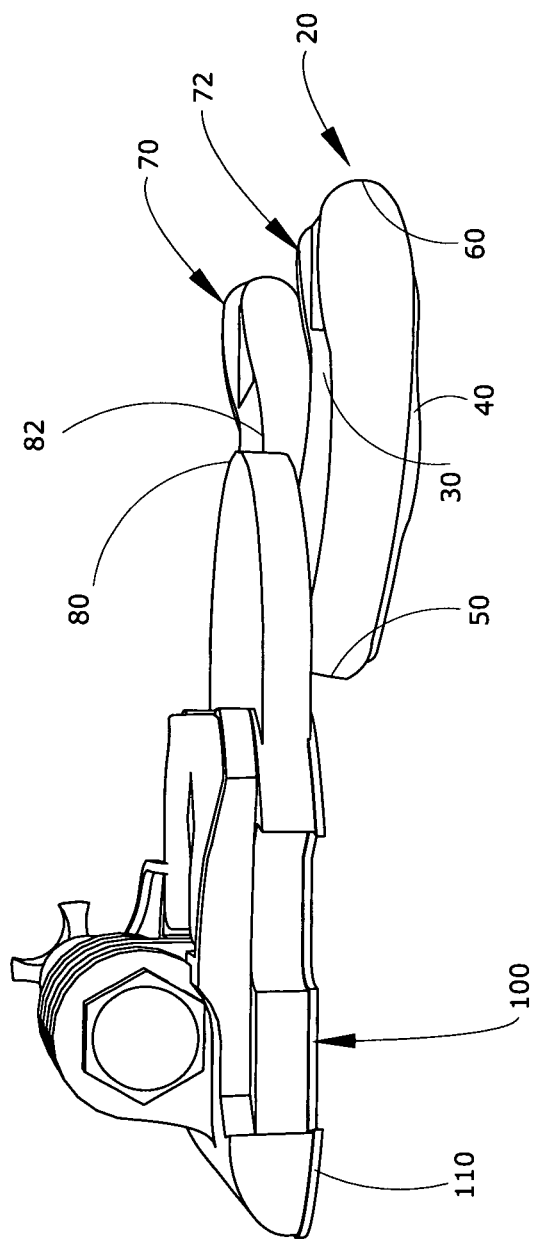
FIG. 3 is a side view of the support unit in combination with a mini-camera support with the bottom side facing upwards in FIG. 3.

A camera-supporting platform 100 is mounted on first (top) surface 30 of the base forward-adjacent to the teeth-engaging channels. For purposes of this description, it is noted that the top surface 30 of the mouthpiece having the platform mounted thereon will be located beneath the mouthpiece when the mouthpiece is held in the user's mouth. Thus, the teeth-engaging channels will accommodate the user's upper molars. This descriptive orientation is best understood by viewing FIG. 2 as a top side view in which the unit is right-side up whereby the camera will hang down from the platform beneath the user's chin to be out of the way of the user's eyes so it does not block a user's vision. However, this orientation is for descriptive purposes only. A user can choose to invert the support unit whereby the camera will be located in front of his face if he so desires without departing from the scope of this disclosure or the claims associated herewith.

Figure 4:
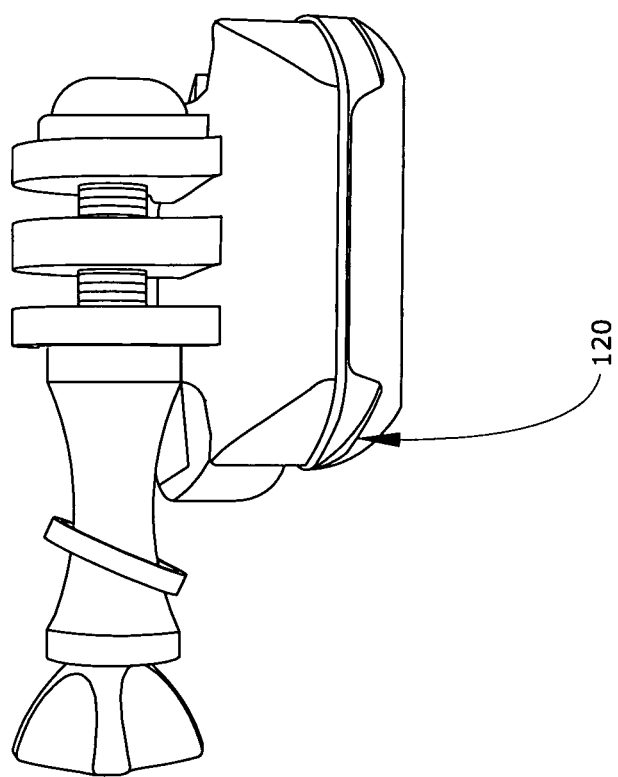
FIG. 4 is a front end view of the support unit in combination with a mini-camera support with the bottom side of the support unit facing upwardly in FIG. 4.

The platform has a camera-supporting platform portion 110 that is located outside the user-s mouth when the base is in use, and a means 120 for releasably mounting a camera on the camera-supporting platform portion. Means, such as channels 120 (see FIG. 4), is located on the bottom of the mouthpiece when the support unit is in use.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A support for a mini-camera for use in hands free operation comprising:
   A) a one-piece base which is adapted to be held in a user's mouth during use and which includes
      (1) a first surface which is a bottom surface when the base is in use,
      (2) a second surface which is a top surface when the base is in use,
      (3) the second surface being planar,
      (4) a first end portion which is a forward end portion and extends outside the user's mouth when the base is in use,
      (5) a second end portion which is an aft end portion and which is located inside the user's mouth adjacent to the user's molar teeth when the base is in use, and
      (6) two-teeth-engaging channels on the first surface and located forward-adjacent to the second end portion of the base and spaced apart from the first end portion of the base, each teeth-engaging channel having a first side wall which is located outside the user's teeth and between the user's teeth and the user's cheek when the base is in use and a second sidewall which extends parallel to the first sidewall and which is located inside the user's teeth and between the user's teeth and the user's tongue when the base is in use, the teeth-engaging channels in combination with the base defining a teeth-accommodating channel into which the user's teeth fit when the user bites the base whereby a user's teeth are accommodated in the teeth-engaging channels to support the base in the user's mouth by the user biting down on the base: and
   B) a camera-supporting platform mounted on the first surface of the base forward-adjacent to the teeth-engaging channels, the platform having
      (1) a camera-supporting platform portion that is located outside the user's mouth when the base is in use, and
      (2) channels located on the bottom of the mouthpiece for releasably mounting a camera on the camera-supporting platform portion.

2. A support for a mini-camera for use in hands-free operation comprising:
   A) a base which is adapted to be held in a user's mouth during use and which includes
      (1) a first end portion which is a forward end portion and extends outside the user's mouth when the base is in use,
      (2) a second end portion which is an aft end portion and which is located inside the user's mouth adjacent to the user's molar teeth when the base is in use, and
      (3) two teeth-engaging channels on the base, the teeth-engaging channels being located on the base to be forward-adjacent to the second end portion of the base and spaced apart from the first end portion of the base, each channel having
         (a) a first side wall which is located outside the user's teeth and between the user's teeth and the user's cheek when the base is in use,
         (b) a second sidewall which is located inside the user's teeth and between the user's teeth and the user's tongue when the base is in use that is located outside the user's mouth when whereby a user's teeth are accommodated in the teeth-engaging channels to support the base in the user's mouth by the user biting down on the base,
         (c) the sidewalls in combination with the base defining a teeth-accommodating channel into which the user's teeth fit whereby a user's teeth are accommodated in the teeth-engaging channels to support the base jn the user's mouth by the user biting down on the base; and
   B) a camera supporting platform mounted on the base forward-adjacent to the teeth-engaging channels, the camera-supporting platform having
      (1) a camera-supporting platform portion that is located outside the user's mouth when the base is in use, and
      (2) channels located on the bottom of the mouthpiece for releasably mounting a camera on the camera-supporting platform portion.

3. The support defined in claim 1 wherein each teeth-engaging channel has a first end located adjacent to the second end portion of the base and a second end which is located to be interposed between the first and second ends of the base to be located inside the user's mouth when the base is in use so that the teeth-engaging portions are located entirely inside the user's mouth when the base is in use.

4. The support defined in claim 3 wherein the sidewalls of the teeth-engaging portions are co-terminal with each other.

\* \* \* \* \*